United States Patent [19]
Benjey

[11] Patent Number: 5,215,110
[45] Date of Patent: Jun. 1, 1993

[54] FUEL TANK VENT SYSTEM AND DIAPHRAGM VALVE FOR SUCH SYSTEM

[75] Inventor: Robert P. Benjey, N535 Walsh Road Dexter, Mich. 48130

[73] Assignee: G.T. Products, Inc., Ann Arbor, Mich.

[21] Appl. No.: 772,728

[22] Filed: Oct. 7, 1991

Related U.S. Application Data

[63] Continuation-in-part of Ser. No. 607,744, Oct. 29, 1990, Pat. No. 5,054,508, which is a continuation of Ser. No. 470,318, Jan. 25, 1990, abandoned.

[51] Int. Cl.$^5$ .............................................. F16K 24/00
[52] U.S. Cl. .................................. 137/43; 137/587; 220/86.2; 220/746
[58] Field of Search ............... 137/43, 587; 220/86.2, 220/746

[56] References Cited

U.S. PATENT DOCUMENTS

| | | |
|---|---|---|
| 4,714,172 | 12/1987 | Morris ............................ 220/86.2 |
| 4,869,283 | 9/1989 | Oeffling et al. ............... 220/86.2 X |
| 5,065,782 | 11/1991 | Szlaga ............................ 137/43 X |
| 5,103,877 | 4/1992 | Sherwood et al. ............ 220/746 X |

Primary Examiner—Gerald A. Michalsky
Attorney, Agent, or Firm—Krass & Young

[57] ABSTRACT

A fuel tank vent valve disposed between the tank and a carbon canister to provide high volume venting between the tank and the canister under normal operating conditions. A diaphragm type control element within the valve pulls an internal valve plate against a seat when the filler pipe cap is removed thereby to close off the vent between the tank and the canister. In one embodiment drainage throughbore is provided in the control element and valve plate to drain liquid fuel which might otherwise collect on and disable the diaphragm control element. In another embodiment the vent valve is provided with a reverse flow flap valve. In another embodiment the vent valve is provided with purge protection apparatus. The system operates with a filler pipe door seal of the type which is opened by the introduction of a filler nozzle. The vent valve is primarily constructed of molded plastic parts.

34 Claims, 7 Drawing Sheets

FIG-10

FUEL TANK VENT SYSTEM AND DIAPHRAGM VALVE FOR SUCH SYSTEM

PRIOR APPLICATIONS

This is a continuation-in-part of U.S. Ser. No. 607,744 filed Oct. 29, 1990, now U.S. Pat. No. 5,054,508, which is a continuation of U.S. Ser. No. 470,318 filed Jan. 25, 1990, now abandoned.

INTRODUCTION

This patent discloses a vehicular fuel tank vent system which vents fuel vapors from the tank to a vapor trap under normal operating conditions, and which assumes a non-venting condition when the fuel tank filler cap is removed. In addition, a diaphragm valve suitable for use in such a system is disclosed.

BACKGROUND OF THE INVENTION

It is well understood in the vehicle fuel storage and delivery art that it is necessary to vent a vehicle fuel tank to relieve vapor pressure build-up which may occur when the filler pipe cap is in place and to permit the escape of air during normal filling operations when the filler cap is removed. Environmental control laws and regulations require that vehicle fuel tank systems include safeguards to prevent the excessive escape of fuel vapors under normal operating conditions and to prevent the escape of raw fuel from the tank in the event of a roll-over accident or the assumption of an abnormal vehicle attitude.

In this connection it is well known to vent the fuel system to a vapor trap such as a carbon canister. It is important to ensure that fuel vapors and/or raw fuel from the tank does not flood the canister during normal vehicle operation or during filling. This can be achieved with a device known as a "head valve"; such a device is disclosed in U.S. Pat. No. 4,753,262 issued Jun. 28, 1988 and assigned to the assignee of this patent. Another rollover valve is shown in U.S. Pat. No. 4,095,609 issued Jun. 20, 1978 and assigned to Chrysler Corporation.

While excessive pressure in the tank is the more commonly recognized problem, it is also true that a vacuum or negative pressure can be created in the interior of a fuel tank upon rapid cooling of the heated vapor volume contained herein. If this negative pressure condition is not relieved, even a slight pressure drop acting over the interior surface of the fuel tank can cause it to buckle or collapse. This can change fuel capacity, decalibrate the fuel gage and create a fuel spill hazard.

SUMMARY OF THE INVENTION

The principal objective of the present invention is to provide a high volume venting system between a fuel tank and a fuel vapor trap, such as a carbon canister, under all normal operating vehicle conditions and to provide a pressure responsive valve in such system to close the vent when the fuel tank filler cap is removed. In general this is accomplished through the use of a vent valve which is connected between the fuel tank and the vapor trap which is held open by vapor pressure in the fuel tank but which closes in response to an atmospheric pressure condition in the portion of the fuel tank filler pipe near the inlet opening of the filler pipe when the cap is removed.

The invention further resides in a fuel tank vent valve suitable for use in a vent system wherein a high volume vent between the fuel tank and a vapor trap is closed whenever the fuel tank filler cap is removed. This vent valve preferably comprises a valve body formed of plastic or other suitable material and having an inlet connectable to the fuel tank and an outlet connectable to the vapor trap (carbon canister). A valve seat is formed in the body between the inlet and the outlet and mates with an axially movable valve element. Vapor pressure in the tank normally holds the valve element off the seat to permit high volume venting. A control element in the form of a diaphragm is also mounted in the valve body and is mechanically connected to the valve element. One side of the diaphragm is exposed to fuel tank pressure and the other side of the diaphragm is exposed to the pressure conditions in the filler pipe to communicate the atmospheric pressure condition in the filler pipe when the fuel filler cap is removed to the upper side of the diaphragm. The resulting pressure imbalance causes movement of the diaphragm, and the mechanical connection pulls the valve element to the closed position. The closing force may be assisted by a light bias spring. The closure is maintained at all pressures since the effective area of the diaphragm is larger than the valve seat area.

An objective of another embodiment of the present invention is to provide a reverse flow path for fuel vapor from the vapor trap to the fuel tank when negative pressure in the tank closes the vent valve. This is accomplished by way of a one-way vent that remains closed during the normal operation of the vent valve, i.e., when the tank is at positive pressure and the vent valve controls vapor flow from the tank to the vapor trap. When tank pressure drops below pressure in the vapor trap, creating a reverse flow that closes the vent valve, the one-way vent opens.

In a preferred form of this embodiment, a vent is formed in the valve seat outward of the position of the valve element on the seat. A flap valve is disposed on the valve seat to cover the vent mediate the valve seat and the inlet from the fuel tank, and is normally held closed by vapor pressure in the tank. When tank pressure drops below that of the vapor trap and the valve element is pulled closed against the seat by vacuum forces, the flap valve is pulled open. In this manner, the vacuum in the tank is quickly relieved to prevent the tank from buckling or collapsing.

In another embodiment of the invention a drainage path is provided from the upper surface of the diaphragm to drain liquid fuel which might otherwise accumulate and permanently force the valve element to the open position. This drainage path is preferably provided as a throughbore in the diaphragm and valve element extending from the upper surface of the diaphragm to a lower portion of the valve body. In the illustrated embodiment liquid fuel is drained from the upper surface of the diaphragm to a chamber adjacent the outlet to the vapor canister.

In another embodiment, a rollover valve is incorporated in the vent valve and comprises a rollover element operating in an independent, complementary fashion with the vent valve element. The rollover element is operated by gravity to close the drainage throughbore in a vehicle rollover situation. In a particular embodiment, the rollover element is positioned to slide axially within the throughbore in the vent valve element independently thereof.

The rollover element is further provided with axial guide structure to prevent rotational forces acting on it in the closed position from breaking the seal between the rollover element and the drainage throughbore.

In yet another embodiment of the invention, the diaphragm control element is sealed off from the valve element and the canister and fuel tank inlets/outlets. One side of the diaphragm is maintained at atmospheric pressure, while the other side is alternately exposed to tank or atmospheric pressure, depending on whether the filler pipe cap is on or off.

DETAILED DESCRIPTION OF THE ILLUSTRATIVE EMBODIMENT

Referring to the figures, a fuel storage tank 10 is mounted in a vehicle (not shown) and is equipped with a filler pipe 12 which extends to a conventionally threaded inlet opening 14 proximate the exterior body portions 16 of the vehicle. The threaded inlet opening 14 is adapted to receive a cap 18 which, when in place, effectively seals the filler pipe 12.

Filler pipe 12 is additionally provided with a spring biased door 20 which is sufficiently proximate the inlet opening 14 to be displaced open by the introduction of a conventional fuel dispenser valve nozzle (not shown). The door 20 closes when the filler nozzle is removed; i.e., typically after a filling operation has been completed. Door 20, therefore, prevents the excessive escape of fuel vapor from the freshly filled tank 10 during the typically short time period between the termination of the filling operation and the replacement of the cap 18. Door 20 is currently a relatively unsophisticated metal structure; however, the invention disclosed herein contemplates use with doors having significantly more effective seals as well. Such seals may require a designed bleed or a small-volume bypass as hereinafter explained. A conventional vent line 21 runs from the tank to a point in the filler pipe 12 below door 20 to vent displaced air during filling.

Figures 1, 2:
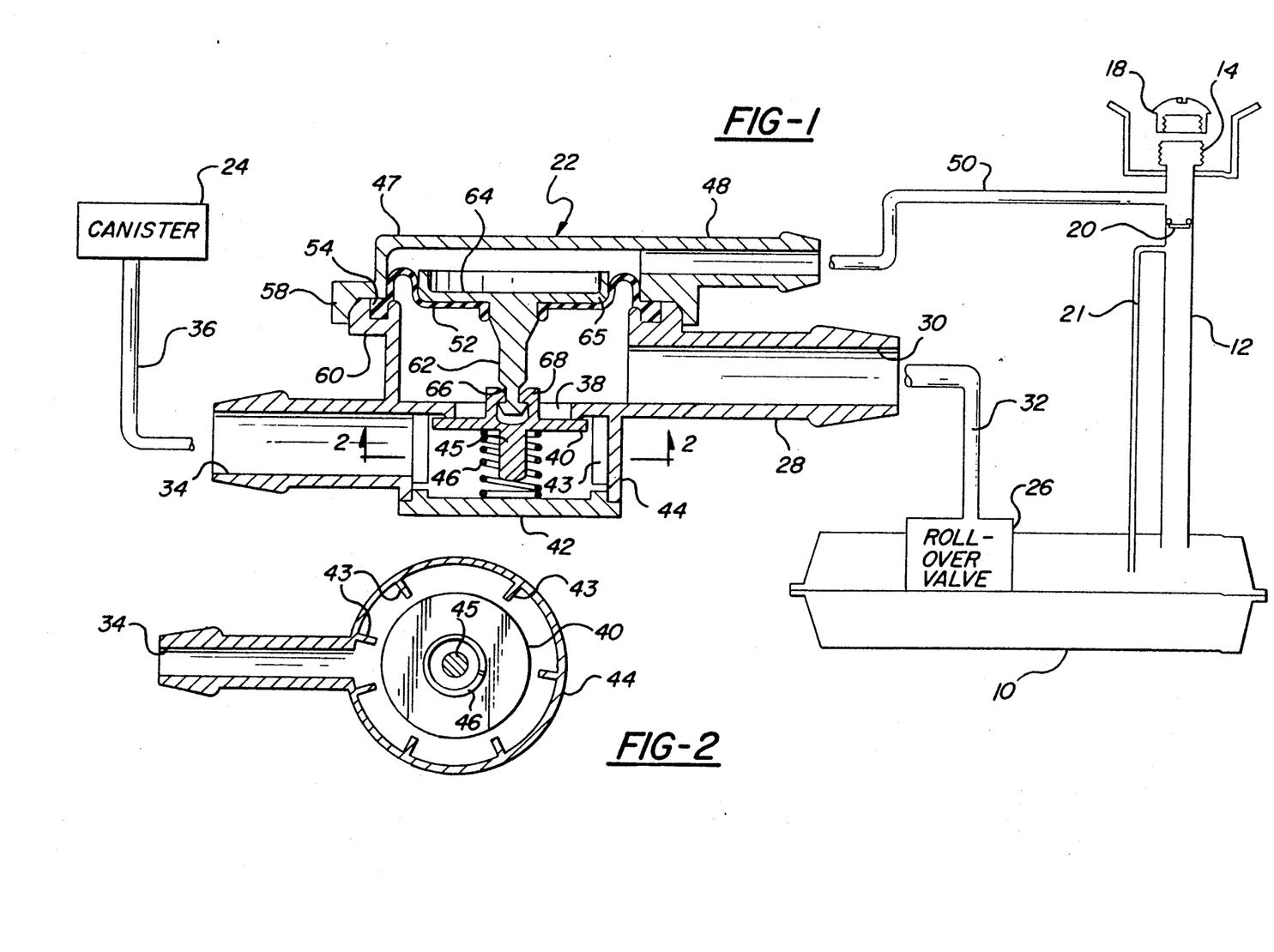
FIG. 1 is an overall schematic view of a fuel vent system embodying the invention and a sectional view of the details of the diaphragm valve showing its location and operative connections in the system.
FIG. 2 is a sectional view through a portion of the valve body as indicated.

The drawing further discloses in detail a vent valve 22 which is connected between the tank 10 and a carbon canister 24 which acts as a fuel vapor trap. The vehicle system may further be provided with a roll-over valve 26 to prevent the escape of raw fuel from the tank 10 through the vent valve 26 in the event of a roll-over accident or an unusual vehicle attitude. Valve 26 may be essentially of known construction.

Vent valve 22 comprises a multi-part body including a first molded plastic body portion 28 having an essentially tubular inlet 30 adapted for connection to a fuel vapor vent line 32 which is connected to the interior of the tank 10 through the roll-over valve 26. Valve body portion 28 further comprises an essentially tubular outlet portion which is adapted for connection to a vent line 36 which is connected to the carbon canister 24. Between the inlet 30 and the outlet 34 the central cylindrical portion of the valve body is provided with an annular valve seat 38 adapted to receive and mate with a disk-like valve element 40 which may also be constructed of molded plastic. Valve element 40 is adapted for longitudinal motion along the illustrated center line and is maintained in its central position by a plurality of ribs 43 which are molded into the cylindrical wall 44 of the central cylindrical portion of the valve body portion 28. An axially projecting finger 45 of the valve element 40 projects into the interior of a light stainless steel bias spring 46 which urges the valve plate 40 against the seat 38. If diaphragm 52 has some spring-like compliance, spring 46 may be omitted.

The vent valve 22 further comprises a second molded plastic body portion 47 forming a tubular inlet 48 which is adapted for connection to a filler pipe pressure line 50 which is connected into the filler pipe 12 above the door 20 and in the vicinity of the fuel inlet 14 for purposes to be described.

A disk-like diaphragm 52 of suitable flexible material such as fluorosilicone rubber is mounted in the valve 22 by way of an annular, peripheral welt 54 which is received in and trapped between the mating flanges 58 and 60 of the valve body portions 48 and 28 respectively. Diaphragm 52 is press fit onto the center pin 62 of a cup-shaped carrier 64 having an annular exterior shoulder 65 to control the shape of the diaphragm 52. Center pin 62 terminates at the lower end in a necked-down portion 66 which receives inwardly projecting spring tangs 68 formed integrally with the valve plate 40 to mechanically interconnect the valve plate 40 with the carrier 64. Assembly of the valve 22 is facilitated by this mechanical interconnection but it will be apparent to those skilled in the art that various alternative constructions are possible in which the elements are either integrally formed, otherwise unified or separated by boundaries at locations other than those shown. The valve body elements 28, 42, and 47 of the illustrated device are adhesively bonded and/or welded by ultrasonic techniques or the like.

Operation

In normal vehicle operation the tank 10 is at least partially filled and the cap 18 is in place on the filler neck 14 to seal the fuel tank. Door 20 is closed but, either because it is a relatively crude seal or includes a designed bleed as previously described, pressures on opposite sides of seal 20 eventually equalize. If the vehicle is in a normal attitude, roll-over valve 26 is open. Therefore, vapor pressure in tank 10 is applied to the under side of the diaphragm 52 by way of line 32 and inlet 30. Similarly, tank vapor pressure is applied to the upper side of the diaphragm and to the cup-shaped member 64 by way of line 50 and inlet 48. The effective areas on opposite sides of the diaphragm 52 and carrier 64 are selected to respond to this equalized pressure condition to apply effectively no force to the valve element 40. Vapor pressure in tank 10, therefore, operates on the top surface of valve plate 40 to displace it against the light action of the spring 46 (canister 24 operates at essentially atmospheric pressure). The vapor pressure in tank 10 is thus communicated through inlet 30 around valve plate 40, clearance for high volume transfer being provided by the ribs 43, through outlet 34 and through line 36 to the canister 24. This is a high volume, low restriction venting condition.

When the cap 18 is removed, atmospheric pressure exists in the area of the filler inlet 14 and is communicated via line 50 to the cup-shaped carrier 64 and, therefore, effectively to the top of the diaphragm 52. Due to the door 20, relatively higher tank pressure is communicated to the bottom of the diaphragm 54 and the net force drives the carrier 64 upwardly within the valve body 22 pulling the valve plate 40 against the seat 38. This closes the vent between the tank 10 and the canister 24 to effectively prevent transmitting any vapor or liquid to the canister during a filling operation.

The system described above is operable with simple metal doors 20 as well as with the more effective seals which are proposed for future automobiles. Moreover, the system is compatible with filler nozzle designs which include provision for vapor extraction during filling.

The Embodiment of FIGS. 3 to 6

Figures 3, 4:
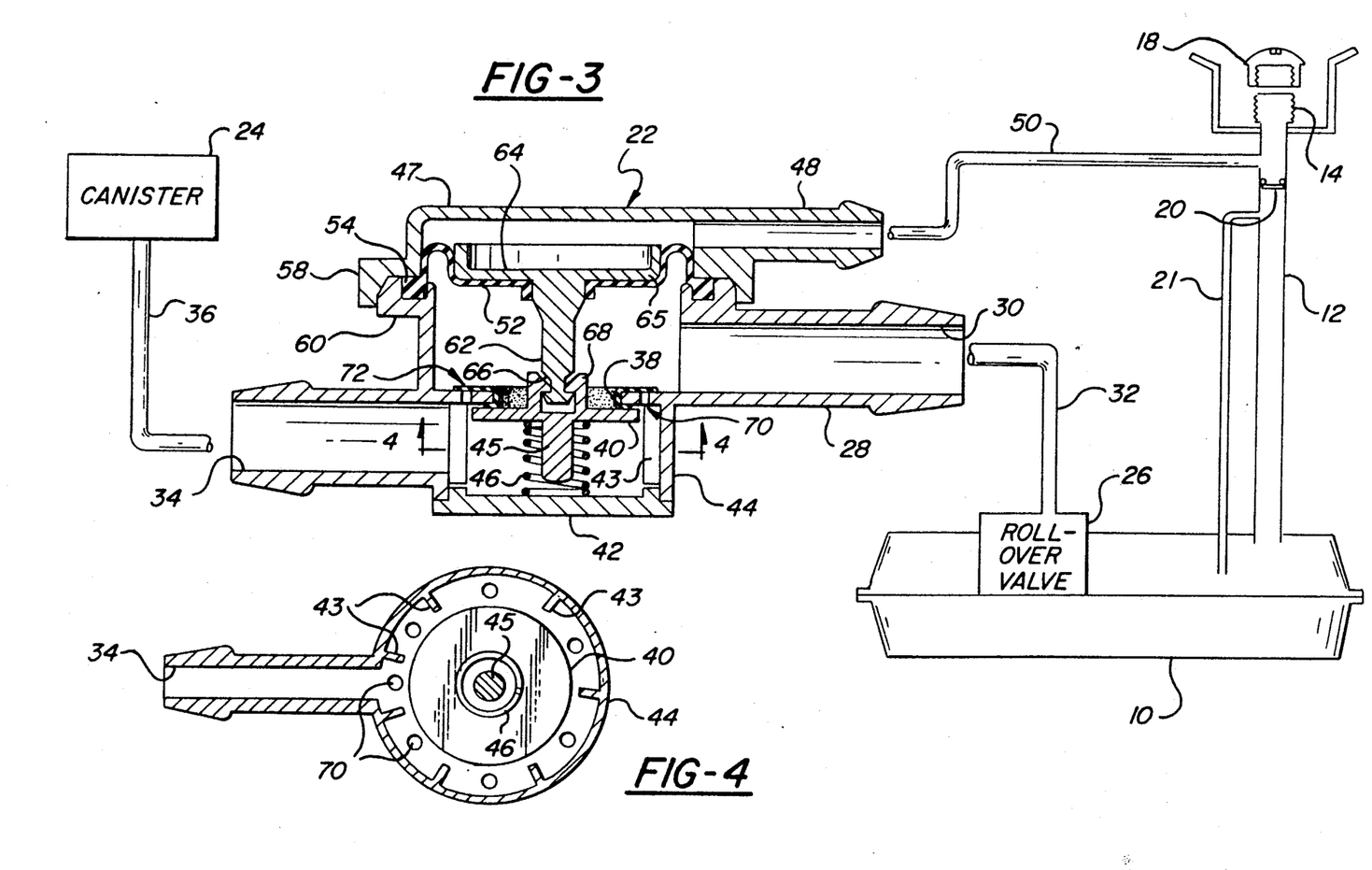
FIG. 3 shows the system of FIG. 1 incorporating a reverse flow vent according to an alternate embodiment of the invention.
FIG. 4 is a sectional view through a portion of the valve body of FIG. 3.

Valve seat 38 has formed therein a plurality of vents 70 radially outward of the position of valve plate 40 when held against seat 38, effectively bypassing the opening defined by seat 38 to provide communication between inlet 30 connected to the tank 10, and outlet 34 connected to the carbon canister 24. Vents 70 are unobstructed by valve plate 40 even when the plate is seated firmly against seat 38.

Figures 5, 6:
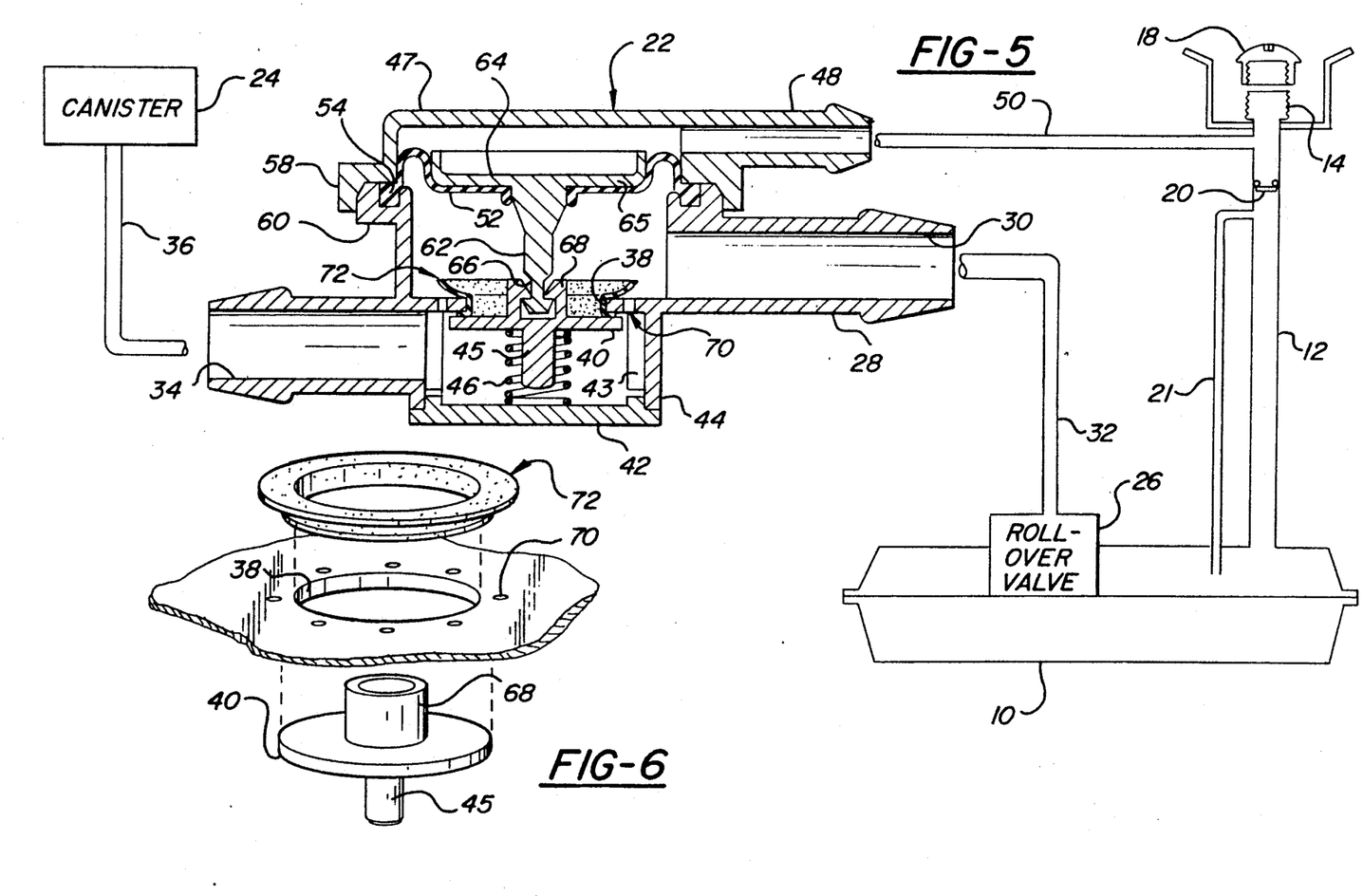
FIG. 5 is a view of the embodiment of FIG. 3 showing the reverse flow vent in an open position.
FIG. 6 is an exploded perspective view of a portion of the diaphragm valve and the reverse flow vent of the embodiment of FIGS. 3 to 5.

A flexible annular flap valve 72, premolded with a J-shaped cross-section comprising a large diameter upper flange 73 and a smaller diameter lower flange 74 joined by bight portion 75, is press-fit onto valve seat 38 with upper flange 73 overlying vents 70 on the upper surface of the valve seat mediate the valve seat and inlet 30. Lower flange 74 engages the lower surface of valve seat 38 radially inward of vents 70. Flap valve 72 is preferably made of a thin-walled, pliable material such as fluorosilicone rubber and is molded such that it engages valve seat 38 in a secure friction fit when installed as shown in the drawings, particularly adjacent bight portion 75. The end of upper flange 73 radially outward and above vents 70, due to its distance from bight portion 75 and the pliable nature of the material used, will tend to engage the surface of the valve seat 38 with less force than either its inboard end or shorter lower flange 74.

Although flap valve 72 is shown in the illustrated embodiment as a pliable, pre-molded, J-shaped cross-section valve, other forms will be apparent to those skilled in the art. For example, flap valve 72 could be a flat annular ring with an inner diameter folded around valve seat 38 and fastened to the lower surface thereof adhesively or mechanically upon assembly of the valve. Alternatively, a flat annular ring having an inner diameter radially inward of vents 70 and an outer diameter radially outward of vents 70 could be fastened at its inner diameter to the upper surface of valve seat 38. Yet another embodiment envisions a plurality of individual flap valves 72 corresponding to vents 70, for example a plurality of one-way axial poppets mounted in vents 70.

However, a one piece, flexible, pre-molded valve such as that shown in the drawings is preferred for its economical manufacture, ease of assembly with the valve seat and sensitivity to pressure changes in the fuel tank. Also, although flap valve 72 is shown frictionally secured to valve seat 38 in a press-fit, it could be additionally fastened at lower flange 74 to the lower surface of seat 38 mediate the seat and valve plate 40, for example adhesively or mechanically.

In the illustrated embodiment in which lower flange 74 of flap valve 72 engages the lower surface of valve seat 38, the resilient nature of the flap valve material improves the seal between plate 40 and seat 38.

Vapor pressure in tank 10 is also applied to the upper surface of upper flange 73 of flap valve 72, pressing firmly against vents 70 to form a tight seal.

With valve plate 40 pulled close against valve seat 38 by diaphragm 54 as shown in FIG. 3, the relatively higher tank pressure communicated to the underside of diaphragm 54 will maintain upper flange 73 of flap valve 72 against vents 70 to prevent fuel vapor from flowing from tank 10 to carbon canister 24.

As previously described, with cap 18 closing filler inlet 14, and normal above-atmospheric vapor pressure in tank 10, valve plate 40 is displaced from valve seat 38 to permit vapor flow from tank 10 to carbon canister 24. If the heated vapor volume in tank 10 is suddenly cooled, for example by tank contact with cold water or snow, the vapor can contract in a known manner to create a sub-atmospheric or negative pressure in tank 10. If this negative pressure is not relieved, the vacuum forces exerted on the surface of tank 10 can cause it to buckle or even collapse, creating a serious fuel spill hazard. Referring to FIG. 5, filler inlet 14 is closed by cap 18 and a negative pressure differential exists between tank 10 and carbon canister 24 (which is typically at atmospheric pressure), causing reverse flow of fuel vapor and air from the canister through valve 22 to the tank. This reverse flow acts on both the valve plate 40 and diaphragm 52 to pull valve plate 40 closed against seat 38.

When valve plate 40 closes, the negative pressure differential operates through vents 70 to raise the outboard end of upper flange 73 of flap valve 72, permitting reverse flow from canister 24 to tank 10 to continue through vents 70 and relieve the negative pressure in the tank. In this manner, tank 10 is protected against possible damage or collapse. When pressure between canister 24 and tank 10 equalizes, upper flange 73 will again drop down onto vents 70.

Figure 7:
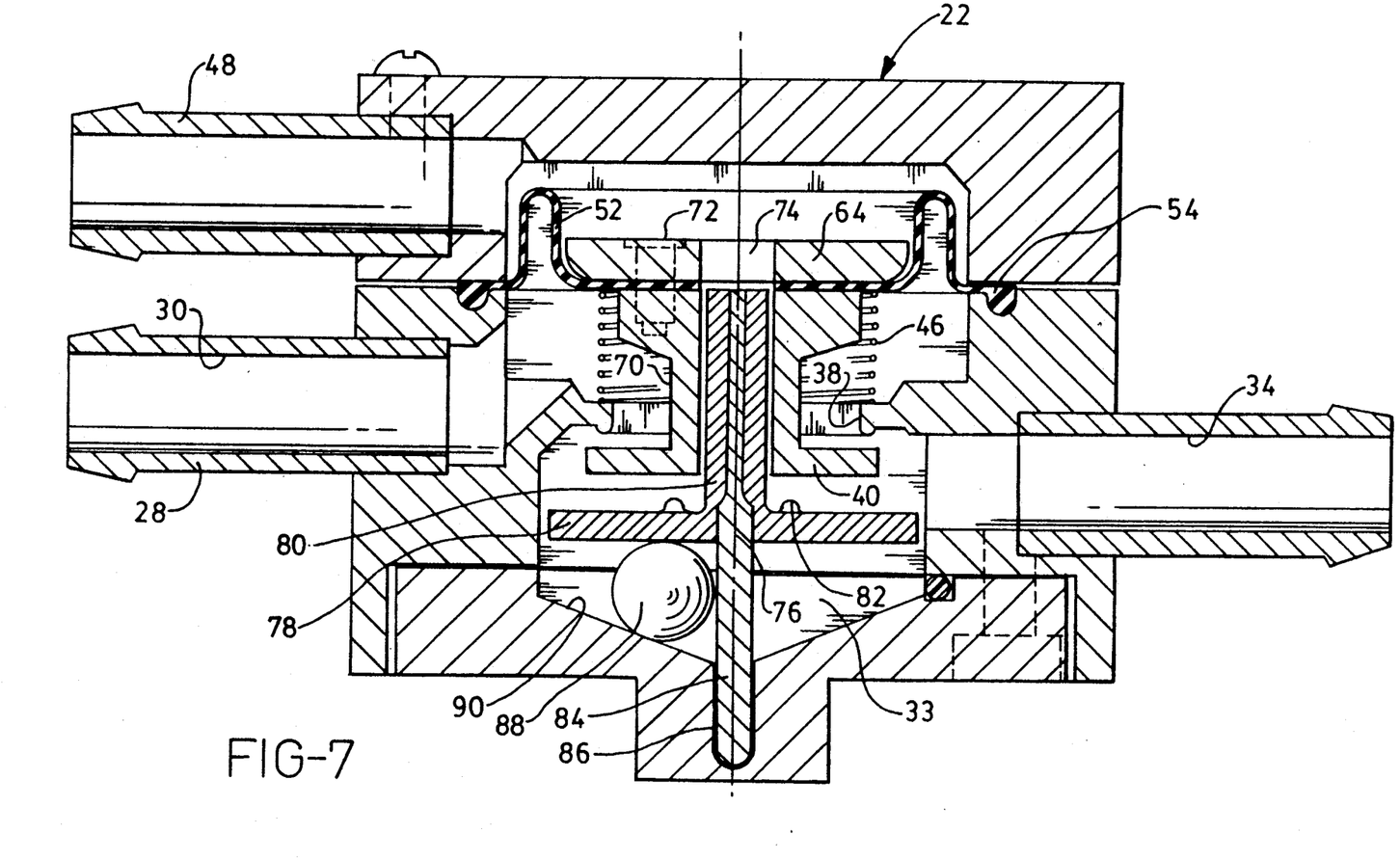
FIGS. 7 to 9 are sectional views of a third embodiment of the diaphragm valve in two operational modes; and, FIG. 10 is a sectional view of a fourth embodiment of the inventive diaphragm valve.
Figure 8:
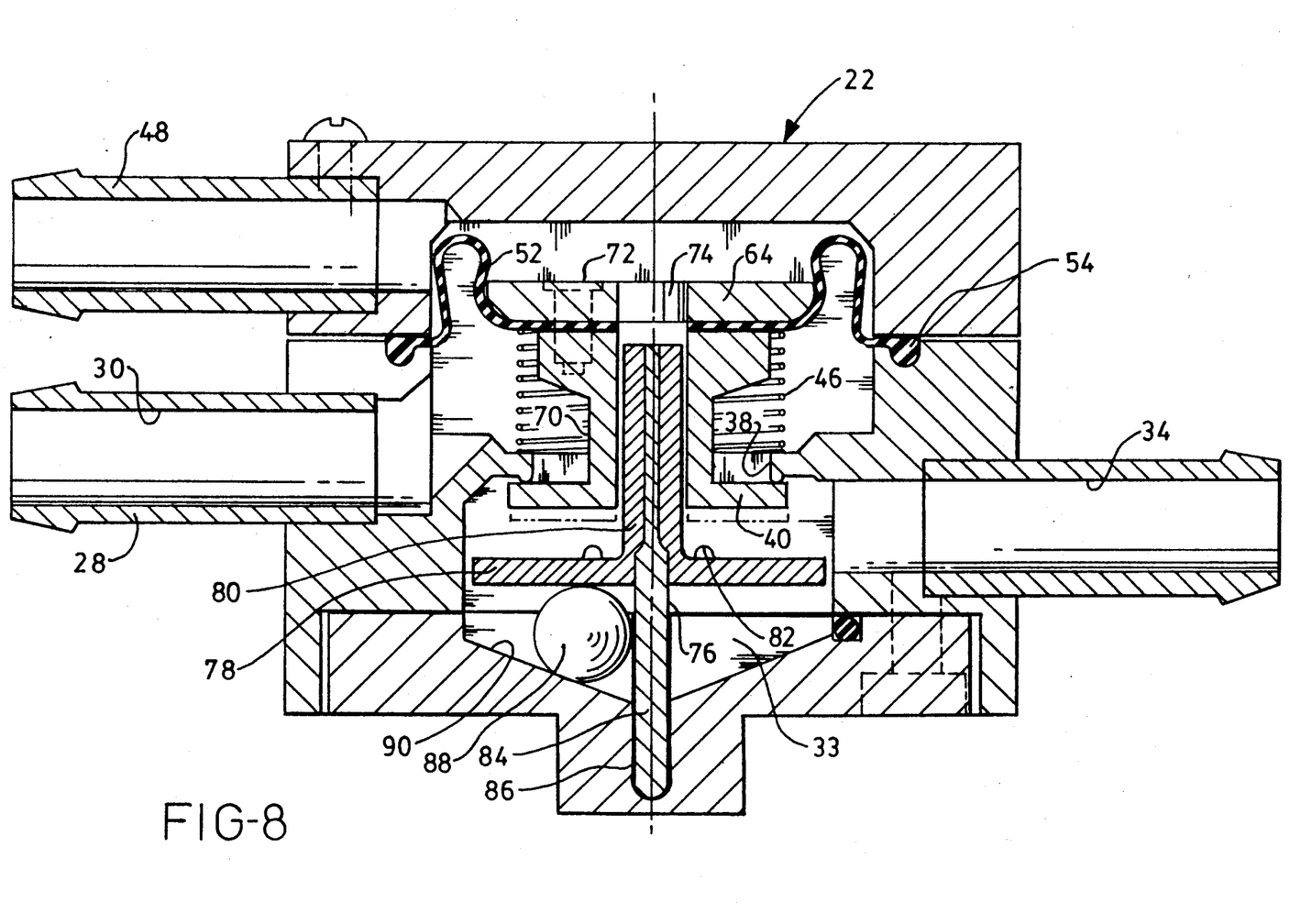
Figure 9:
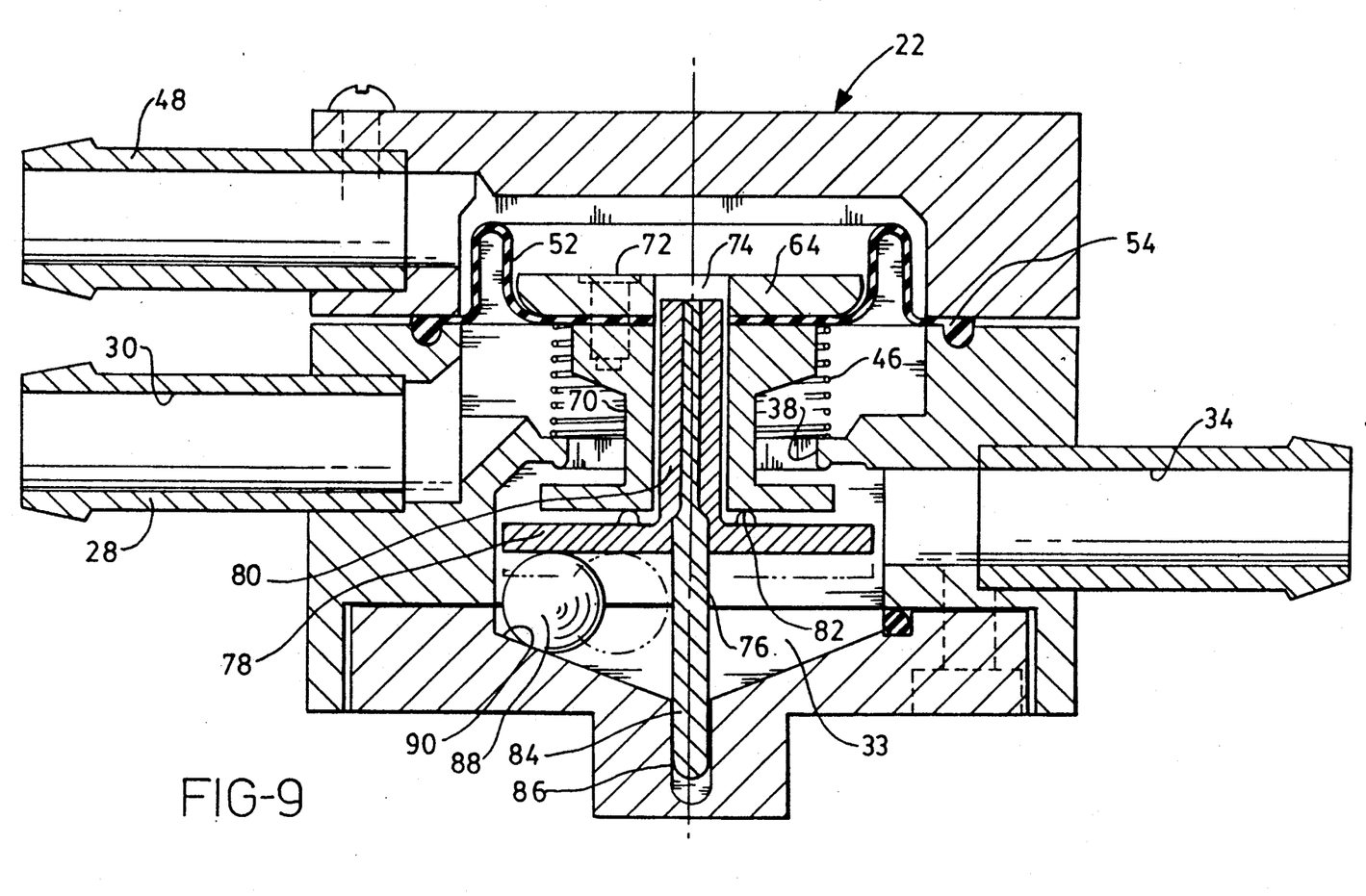

The Embodiments of FIGS. 7 to 9

An alternate embodiment of the invention having improved operational characteristics is shown in FIGS. 7 through 9. The structure of the valve body and the various outlets and inlets to and from the filler neck, the fuel tank and the vapor canister are essentially the same. Where the structure of the valve is similar to that shown in the embodiment of FIGS. 1 and 2, the same reference numerals are employed.

Referring now to FIGS. 7 through 9, valve element 40, cup-shaped carrier 64 and connecting structure 62,66,68 have been essentially integrated as a unitary assembly 70. Valve element assembly 70 is connected to diaphragm 52 and carrier element 64 by way of a threaded bolt 72, although it will be apparent to those skilled in the art that valve element assembly 70 and carrier 64 could be connected to the diaphragm by another method, for example adhesively or by ultrasonic welding or the like. As in the embodiment of FIGS. 1 and 2, valve element assembly 70 and diaphragm 52 move as a unit.

Spring 46 has been repositioned within the valve body to act directly on carrier 64 and diaphragm 52, rather than on valve plate 40 as in the embodiment of FIGS. 1 and 2. The same bias result is achieved; i.e., valve assembly 70, diaphragm 52 and carrier 64 are biased upwardly.

A drainage throughbore 74 is formed in carrier 64, diaphragm 52 and valve element assembly 70 to provide a drain path from the upper surface of diaphragm 52 to the lower interior chamber 33 of the valve body adjacent vapor canister outlet 34. Throughbore 74 provides constant low-volume communication between the upper surface of diaphragm 52 and the vapor canister outlet 34.

A rollover valve element 76 is incorporated into the interior of vent valve 22 in chamber 33, comprising a valve plate 78, an upper guide stem 80 having an X-shaped cross-section extending upwardly into throughbore 74 for axial sliding travel therein, an annular bead or seal 82 formed on the upper surface of roll-over plate 76 with a diameter slightly larger than that of throughbore 74, and a lower axial guide stem 84 extending downwardly into a guide passage 86 formed in the lower portion of the valve body. Rollover element 76 is operated by rollover ball-and-ramp structure 88,90. Rollover element 76 is freely movable up and down along the axis of throughbore 74 independently of valve element assembly 70. Rollover element 76 is preferably made of a lightweight plastic, although other materials can be used.

The venting operation of the valve embodiment shown in FIGS. 7 through 9 is essentially the same as that of FIGS. 1 and 2. When the vehicle is in a normal attitude, rollover ball 88 is in its lowermost position as shown in FIG. 7 under the force of gravity, such that rollover element 76 is in its lowermost, open position. With cap 18 in place on the filler neck 14, fuel tank pressure is transmitted to both sides of diaphragm 52 via fuel tank inlet 30 and filler neck inlet 48. As in the embodiment of FIGS. 1 and 2, the effective areas on opposite sides of diaphragm 52 and carrier 64 are selected to respond to this equalized pressure condition to apply effectively no force to valve element assembly 70. Vapor pressure in the fuel tank 10, therefore, operates on the top surface of valve plate 40 against the light action of spring 46 to overcome the essentially atmospheric pressure acting on the lower surface of valve plate 40 from the canister 24. Vapor pressure in tank 10 is thus communicated through inlet 30 around valve plate 40 and through outlet 34 and line 36 to the vapor canister 24. Vapor flow also occurs from the filler neck to the canister via lines 50,48 and throughbore 74. This is a high volume, low restriction venting condition.

When the cap 18 is removed, atmospheric pressure in the area of the filler neck inlet 14 is communicated via line 50 to the upper surface of diaphragm 52. The relatively higher fuel tank pressure communicated to the bottom of diaphragm 52 via fuel tank inlet 30 drives the diaphragm and valve element assembly 70 upwardly to pull the valve plate 40 closed against seat 38 as shown in FIG. 8. This closes the vent path between fuel tank 10 and the canister 24 to effectively prevent transmitting any vapor or liquid to the canister.

Should liquid fuel be transmitted via line 50 to the upper surface of diaphragm 52 and carrier 64, for example due to failure of the automatic shut-off apparatus in the filler nozzle, throughbore 74 drains the fuel from the upper surface of diaphragm 52. This prevents liquid from accumulating on the upper surface of diaphragm 52 so as to overcome the force of spring 46 and bias valve element assembly 70 to the open position regardless of the position of the cap 18 on the filler neck. The fuel drained off the upper surface of diaphragm 52 and carrier 64 in this manner enters the lower interior chamber 33 of the valve body adjacent canister outlet 34, where it either evaporates or is transmitted in liquid form to the canister. The amount of drained fuel in this situation is small enough that it has no harmful effect on the operation of the canister; i.e., it is not enough to flood or saturate canister 24.

Should the vehicle be tilted or rolled over, the force of gravity on rollover ball 88 will cause it to travel upwardly along inclined rollover ramp 90, forcing rollover element 76 upwardly to a closed position as shown in FIG. 9 in which annular bead or seal 82 abuts the lower surface of valve element plate 40 to seal off throughbore 74. Liquid fuel is thus prevented from flowing from the fuel tank through line 50, inlet 48 and through the valve to the vapor canister, where it could leak to the surroundings.

Lower axial guide stem 84 riding in stem guide aperture 86 limits the movement of rollover element 76 to movement in an axial direction. Because rollover ball 88 acts on one side of rollover valve plate 76, a moment force is generated tending to pivot valve plate 76 about the adjacent portion of annular seal 82. This lever action on the valve element, if unchecked, would break the liquid-tight seal formed between annular seal 82 and the lower surface of valve element plate 40. The close sliding fit between lower axial guide stem 84 and stem guide aperture 86 counteracts this opening moment to maintain the effectiveness of the seal between the rollover element 76 and valve element assembly 70.

Additionally, the light weight and high surface area of rollover element 76 allows it to function as an anti-"puff loss" valve. A pressure gradient typically exists in vent line 36 between valve 22 and canister 24, which pressure gradient can create a "puff loss" of expelled fuel vapor when the filler pipe cap is removed. The lightweight nature of the present rollover element 76 allows it to respond to the pressure gradient in canister vent line 36 as a pressure-responsive check valve, moving upwardly to the closed position when the filler cap is removed independent of rollover ball 88. This briefly closes off throughbore 74 until the pressure gradient is dissipated. Otherwise, pressure in canister vent line 36 might back up through throughbore 74 and out filler neck line 50 to filler neck inlet 14 and the atmosphere.

FIG. 10 Embodiment

Figure 10:
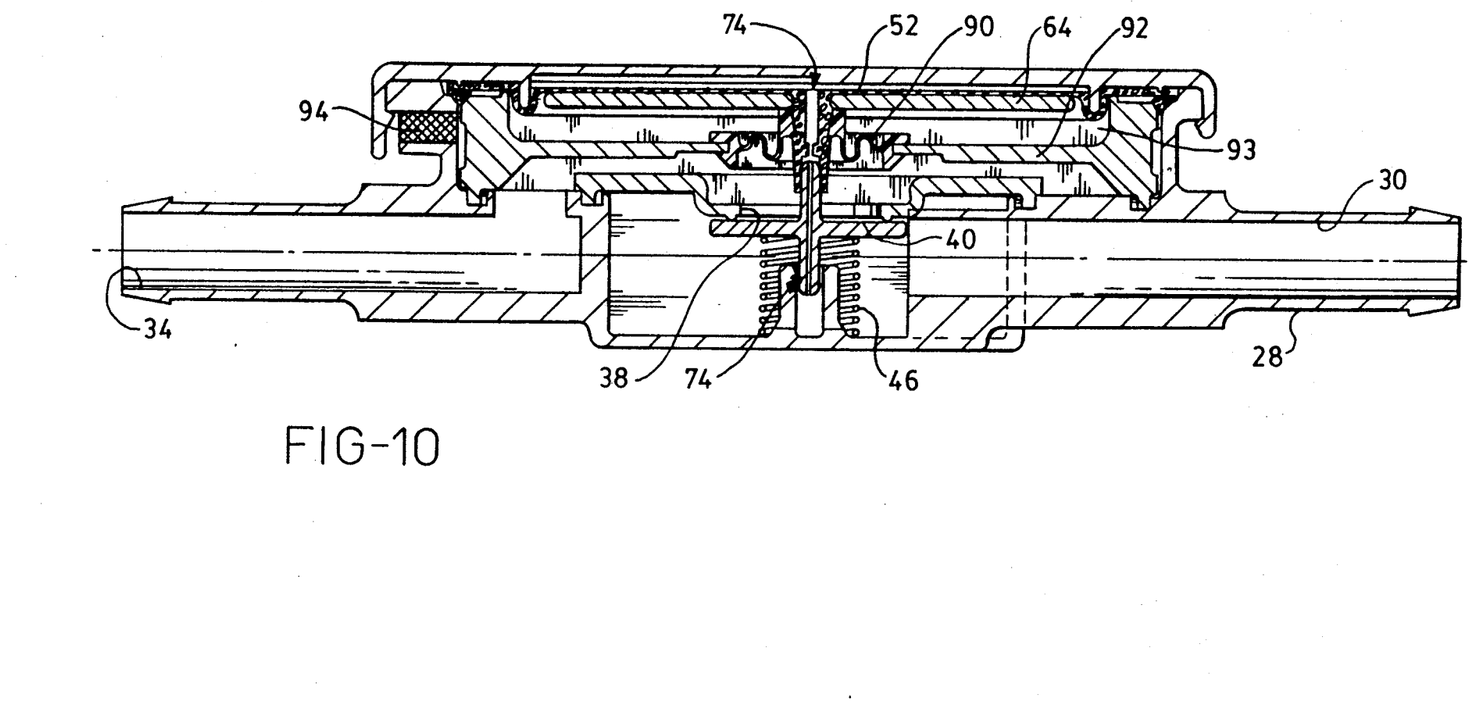

Still another embodiment of the present invention is shown in FIG. 10. The venting operation of the valve embodiment in FIG. 10 is essentially the same as that disclosed in the previous embodiments, and reference numerals are the same where the structure is similar.

Referring now to FIG. 10, carrier 64 and its connecting structure (analogous 62, 66, 68 in FIGS. 1-6) are connected to valve element 40 and a rolling seal 90. Rolling seal 90 is a flexible diaphragm similar to diaphragm 52, and moves with diaphragm 52 and carrier 64 while maintaining an airtight seal with interior valve body partition 92. An intermediate chamber 93 is thus defined between the lower surface of diaphragm 52 and interior partition 92 above valve element 40 and valve seat 38. Intermediate chamber 93 is maintained at atmospheric pressure by way of a breather element 94 communicating with the atmosphere.

As in the embodiment shown in FIGS. 7 through 9, a throughbore 74 is formed in carrier 64, connecting structure 62, 66, 68 and valve element 40 such that liquid fuel accumulating on the upper surface of diaphragm 52 drains down into the lower chamber of the valve body adjacent the fuel tank inlet 30.

As in the previous embodiments of the invention, valve element 40 is normally biased to an open position off valve seat 38 when cap 18 is closed on the filler neck inlet 14. Fuel tank pressure is thus transmitted via signal line 50 (not shown) and inlet 48 (not shown) to the upper surface of diaphragm 52 and carrier 64, overcoming the atmospheric pressure in chamber 92 to force the diaphragm and carrier downwardly against valve element 40 and the light bias of spring 46. The valve is then open to vent fuel vapor from the fuel tank through the valve around valve element 40 to canister 24. Removal of cap 18 from the filler neck inlet 14 results in an equalization of pressures on both sides of diaphragm 52 and carrier 64, with the atmospheric pressure in chamber 93 being balanced by atmospheric pressure transmitted from filler neck inlet 14 via line 50 (not visible from the perspective in FIG. 5) to the upper surface of the diaphragm. In this position the diaphragm and carrier exert no force on the valve element 40, such that spring 46 and the tank/canister pressure differential across valve element 40 bias the valve element up to the closed position abutting valve seat 38 to block vapor flow from the fuel tank to the canister.

The embodiment of the invention shown in FIG. 10 is particularly advantageous in that the rolling seal 90 performs a canister purge protection function during refueling. Modern vehicles often are provided with systems to periodically purge the vapor canister of fuel and fuel vapor. During the purge cycle a vacuum is created in vapor outlet 34, and it is desirable to prevent the flow of fuel vapor from the tank to the canister. During refueling, when substantial fuel vapor is generated in the tank and diaphragm 52 is equalized to close the vent valve, vacuum in the canister outlet 34 creates a pressure differential tending to open the valve. Rolling seal 90 protects diaphragm 52 from the purge vacuum, and by making the surface area of rolling seal 90 equal to or slightly less than that of valve element 40, the pressure differential across the latter and the force of spring 46 are sufficient to maintain valve element 40 on the valve seat.

The foregoing are illustrative embodiments only. It will be apparent to those skilled in the art that many variations and modifications of the specific structure disclosed will lie within the scope of the appended claims.

I claim:

1. In a vehicle fuel system of the type which includes a fuel tank, a filler pipe for admitting fuel to the tank, a cap for closing the filler pipe inlet and a vapor trap for collecting fuel vapor vented from the tank:
   a vent valve connected between the tank and the vapor trap and having an open condition and a closed condition, said vent valve including first means for placing said valve in an open, venting condition when the outer end of the filler pipe inlet opening is closed, and second means for placing said valve in a closed, non-venting position when the outer end of the filler pipe inlet opening is open, the vent valve comprising:
   a valve body having a vapor inlet from the tank, a vapor outlet to the vapor trap, a valve seat between the inlet and outlet and a valve element biased toward and matable with said seat, and
   a control element connected to the valve element for maintaining the valve element on said seat when the filler pipe inlet is at atmospheric pressure, wherein the vent valve further comprises drainage means formed in the valve element to permit liquid fuel to drain through said valve element and said valve seat regardless of the position of the valve element on the valve seat.

2. Apparatus as defined in claim 1, wherein said vent valve further comprises rollover means associated with said drainage means to close said drainage means in the event of vehicle tilt or rollover.

3. Apparatus as defined in claim 2, wherein said rollover means comprises a rollover control element movable independently of said valve element, said rollover element normally biased to an open position by gravity.

4. Apparatus as defined in claim 3, wherein said rollover means further comprises ball and ramp structure to force said rollover element to a closed position in which the drainage means is closed.

5. Apparatus as defined in claim 3, wherein said rollover control element further comprises first guide means positioned to be axially slidable within said drainage means independent of said valve element.

6. Apparatus as defined in claim 5, wherein said rollover element further comprises seal means formed on a surface adjacent said valve element to provide a liquid-tight seal around said drainage means when the rollover means is in the closed position.

7. Apparatus as defined in claim 6, wherein said seal means comprises an annular bead formed on an upper face of said rollover control element, said bead cooperating with a lower face of said valve element in the rollover closed position to seal off said drainage means.

8. Apparatus as defined in claim 6, wherein said rollover means further includes axial guide means formed in said valve body to counter moment forces on the rollover element in the rollover closed position tending to disrupt the seal formed between the rollover element and the valve element.

9. Apparatus as defined in claim 8, wherein said axial guide means comprises an aperture formed in said valve body and an axial guide stem extending from said rollover element so as to be slidable within said aperture.

10. Apparatus as defined in claim 3, wherein said means comprises a throughbore formed in said valve element.

11. Apparatus as defined in claim 3, wherein said rollover element comprises a rollover plate having an axial stem extending through said drainage means in said valve element, said axial stem slidable within said drainage means so as not to obstruct the drainage means.

12. Apparatus as defined in claim 3, wherein said rollover element is responsive to a pressure gradient in the vent line between the valve and the vapor trap to temporarily close in response to removal of the cap from the filler pipe.

13. A fuel system of the type including a fuel tank, a filler pipe for discharging fuel into the tank, a cap for closing the filler pipe inlet and a vapor trap for collecting fuel vapor vented from the fuel tank, the fuel system further comprising:
- a tank vent valve comprising a valve body defining an interior chamber, an inlet connected to the tank and communicating with said chamber, an outlet connected to a vapor trap communicating with said chamber, a valve seat within said chamber and between said inlet and said outlet, a valve element movable within said chamber into and out of engagement with said seat to control communication between said inlet and said outlet, a control element sealingly disposed within and across said chamber to separate said chamber into a first side which is in constant communication with said tank by way of said inlet, and a second side having a second inlet connected to fluent communication with a tank filler pipe effectively proximate the inlet opening thereof;
- said control element being mechanically connected to the valve element to urge the valve element positively into engagement with the seat when tank pressure substantially exceeds the pressure adjacent the tank filler pipe opening, wherein the vent valve further comprises a drainage throughbore formed in the valve element to permit liquid fuel to drain from said second side of the control element to said chamber regardless of the position of the valve element on the valve seat.

14. Apparatus as defined in claim 13, wherein said vent valve further comprises rollover means in said chamber associated with said drainage throughbore to close said drainage throughbore in the event of vehicle tilt or rollover.

15. Apparatus as defined in claim 14, wherein said rollover means comprise a rollover element movable within said drainage throughbore independently of said valve element.

16. Apparatus as defined in claim 15, wherein said rollover element further comprises seal means formed on the surface adjacent said valve element to provide a liquid-tight seal around said drainage means when the rollover means is in the closed position.

17. Apparatus as defined in claim 16, wherein said rollover means further includes axial guide means formed in said valve body to counter moment forces on the rollover element in the rollover closed position tending to disrupt the seal formed between the rollover control element and the valve element.

18. In a vehicle fuel system of the type which includes a fuel tank, a filler pipe having an inlet opening for admitting fuel to the tank, a cap for closing the inlet opening of the filler pipe and a vapor trap for collecting fuel vapor vented from the tank; a venting system comprising:
- a partition means dividing the filler neck into an outer chamber and an inner chamber communicable with the fuel tank;
- a vent valve connected between the tank and the vapor trap having an open, venting position and a closed, non-venting position;
- means for opening said vent valve when the pressure in the outer chamber is substantially equal to tank pressure; and
- means for closing said vent valve when the pressure in the outer chamber is at substantially atmospheric pressure, wherein the vent valve comprises:
- a valve body having a vapor inlet from the tank, a vapor outlet to the vapor trap, a valve seat between the inlet and the outlet and a valve element biased toward and matable with said seat, said valve element being normally responsive to tank pressure to be displaced from said seat to provide vapor venting from the tank to the trap; and
- a control element connected to the outer chamber and responsive to a pressure differential between the inner chamber and outer chamber to maintain the valve element on the seat, wherein the control element is a diaphragm sealed in said body, means communicating one side of the diaphragm to the outer chamber; and means communicating the other side of the diaphragm to the inner chamber, wherein said vent valve further includes drainage means in said valve element providing a drain from said one side of the diaphragm communicating with the outer chamber to the vapor outlet to the vapor trap.

19. Apparatus as defined in claim 18, wherein said vent valve further comprises rollover means associated with said valve element and said drainage means to close said drainage means in the event of vehicle tilt or rollover.

20. In combination with a fuel storage tank for a vehicle having a fuel vapor trap; a fuel system comprising:
- a filler pipe having a selectively closeable inlet for discharging fuel into the fuel storage tank;
- a rollover valve connected between the tank and the trap to vent the tank when the vehicle is in a normal attitude and to close the tank when the vehicle is not in a normal attitude;
- a control valve in series with the rollover valve and operable between opened and closed positions; and
- condition-responsive means for operating the control valve in response to vapor pressure conditions near the filler pipe inlet, wherein said condition-responsive means further includes drainage means to the vapor trap to prevent liquid fuel from disabling said condition-responsive means.

21. Apparatus as defined in claim 20, wherein the drainage means include a rollover element operable independently of said condition-responsive means to close said drainage means in the event of vehicle tilt or rollover.

22. In a vehicle fuel system of the type which includes a fuel tank, a filler pipe for admitting fuel to the tank, a cap for closing the filler pipe inlet and a vapor trap for collecting fuel vapor vented from the tank;
- a vent valve connected between the tank and the vapor trap and having an open condition and a closed condition;
- said vent valve including first means for opening said vent valve when the filler pipe inlet is closed; and
- second means for closing said vent valve when the filler pipe inlet is open, wherein said vent valve further includes drainage means associated with said first and second means to prevent liquid fuel from disabling the operation of said first and second means in response to conditions at the filler pipe inlet.

23. Apparatus as defined in claim 22, further including rollover means in said vent valve operable in response to vehicle tilt or rollover to close said drainage means.

24. Apparatus as defined in claim 22, wherein the vent valve comprises a valve body having a vapor inlet from the tank, and a vapor outlet to the vapor trap, a valve seat between the inlet and outlet, a valve element biased toward and matable with said seat to block vapor venting from the tank to the trap, and a control element connected to the valve element for displacing the valve element from said valve seat when the filler pipe inlet is at tank pressure.

25. A vent valve as defined in claim 24, wherein the control element is a diaphragm sealed in said body, the vent valve including means communicating one side of the diaphragm to the filler pipe inlet; and means maintaining the other side of the diaphragm at atmospheric pressure.

26. A vent valve as defined in claim 25, wherein said means maintaining the other side of the diaphragm at atmospheric pressure include a partition separating the other side of the diaphragm from the valve seat in an air tight manner.

27. A vent valve as defined in claim 26, wherein the diaphragm control element and the partition define in part an intermediate chamber in the valve body continuously vented to the atmosphere.

28. A vent valve as defined in claim 27, wherein the partition includes a rolling diaphragm seal connected to the diaphragm and the valve element to move therewith.

29. A vent valve as defined in claim 28, wherein said rolling seal diaphragm has a surface area equal to or less than the surface area of the valve element.

30. A vent valve as defined in claim 26, wherein the drainage means comprise a throughbore in the control element and valve element communicating at one end with the one side of the control element communicating with the filler pipe inlet, and at the other end with the vapor inlet from the fuel tank.

31. Apparatus as defined in claim 22, wherein the vent valve comprises a valve body having a vapor inlet from the tank, a vapor outlet to the vapor trap, a valve seat between the inlet and outlet and a valve element biased toward and matable with said seat, said first means comprising a diaphragm control element connected to the valve element for displacing the valve element from the valve seat when the filler pipe inlet is closed, wherein the valve element includes a valve plate between the vapor inlet from the tank and the valve seat.

32. A vent valve as defined in claim 31, further including purge protection means comprising an airtight seal between the outlet to the vapor trap and the control element.

33. A vent valve as defined in claim 32, wherein the airtight seal comprises a rolling diaphragm seal connected to move with the valve element.

34. A vent valve as defined in claim 33, wherein the rolling diaphragm seal is sized such that the pressure differential across the seal during purging of the vapor trap is less than force exerted by said second means for closing the vent valve.

* * * * *

UNITED STATES PATENT AND TRADEMARK OFFICE
CERTIFICATE OF CORRECTION

PATENT NO. : 5,215,110

DATED : June 1, 1993

INVENTOR(S) : Robert P. Benjey

It is certified that error appears in the above-identified patent and that said Letters Patent is hereby corrected as shown below:

Column 10, Lines 53-54, delete "said means" and insert
--said drainage means--.

Signed and Sealed this

First Day of February, 1994

Attest:

BRUCE LEHMAN

Attesting Officer    Commissioner of Patents and Trademarks